United States Patent [19]
Ragavan et al.
[11] 4,275,681
[45] Jun. 30, 1981

[54] SYSTEM GAS ALARM

[76] Inventors: Soman Ragavan, c/o George Spector, 3615 Woolworth Bldg., 233 Broadway; George Spector, 3615 Woolworth Bldg., 233 Broadway, both of New York, N.Y. 10007

[21] Appl. No.: 102,022

[22] Filed: Dec. 10, 1979

[51] Int. Cl.[3] .................... F17C 13/02; G01L 19/12

[52] U.S. Cl. .................... 116/70; 116/151; 137/557

[58] Field of Search .................... 116/70, 112, 151

[56] References Cited

U.S. PATENT DOCUMENTS

| | | | |
|---|---|---|---|
| 879,039 | 2/1908 | Dixon | 116/70 X |
| 980,785 | 1/1911 | Hugill et al. | 116/70 |
| 1,253,741 | 1/1918 | Stebbins | 116/91 |
| 2,834,315 | 5/1958 | Simpson | 116/67 R |
| 3,517,693 | 6/1970 | Dietz | 116/70 X |
| 3,804,054 | 4/1974 | Gallagher | 116/106 |

*Primary Examiner*—Daniel M. Yasich

[57] ABSTRACT

An audible alarm activated by a conventional safety valve of a domestic gas cylinder, so as to warn residents of gas being discharged into the atmosphere and contaminating the same; the alarm including a plug on a chamber into which the gas is discharged so that the plug is pushed outward and pull therewith a trigger arm away from a spring wound, toothed gear along whose edge a pivoted lever is bounced up and down so a hammerhead on the lever end strikes a bell.

2 Claims, 9 Drawing Figures

10
2
3
4
12
51
52
54
57
61
29
46
47
48
49
50
30
32
15
11
14
13
17
25
16
21
20
19
22
18
19a
37
35
39
40
41
34
43
45
31
53
55
56
58
60
59
23
24

Fig. 5
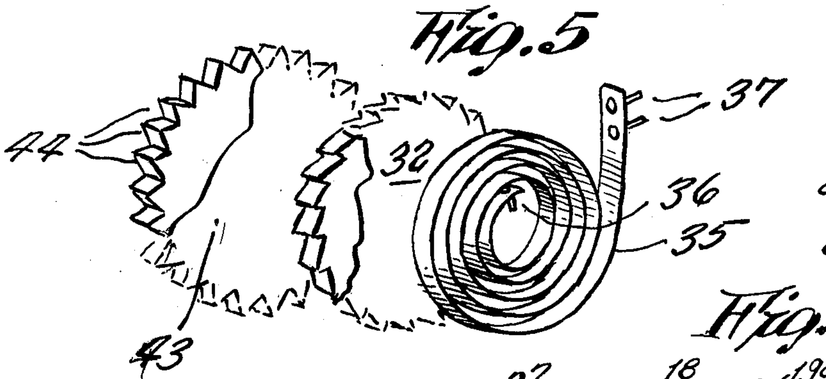
Fig. 6
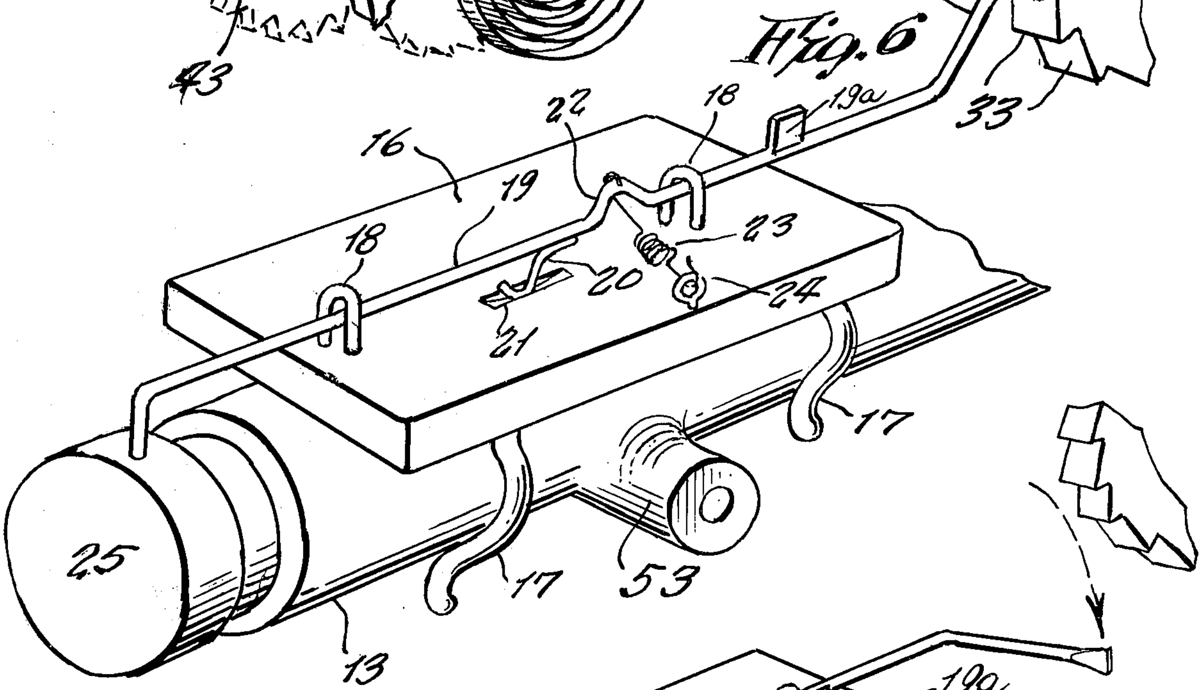
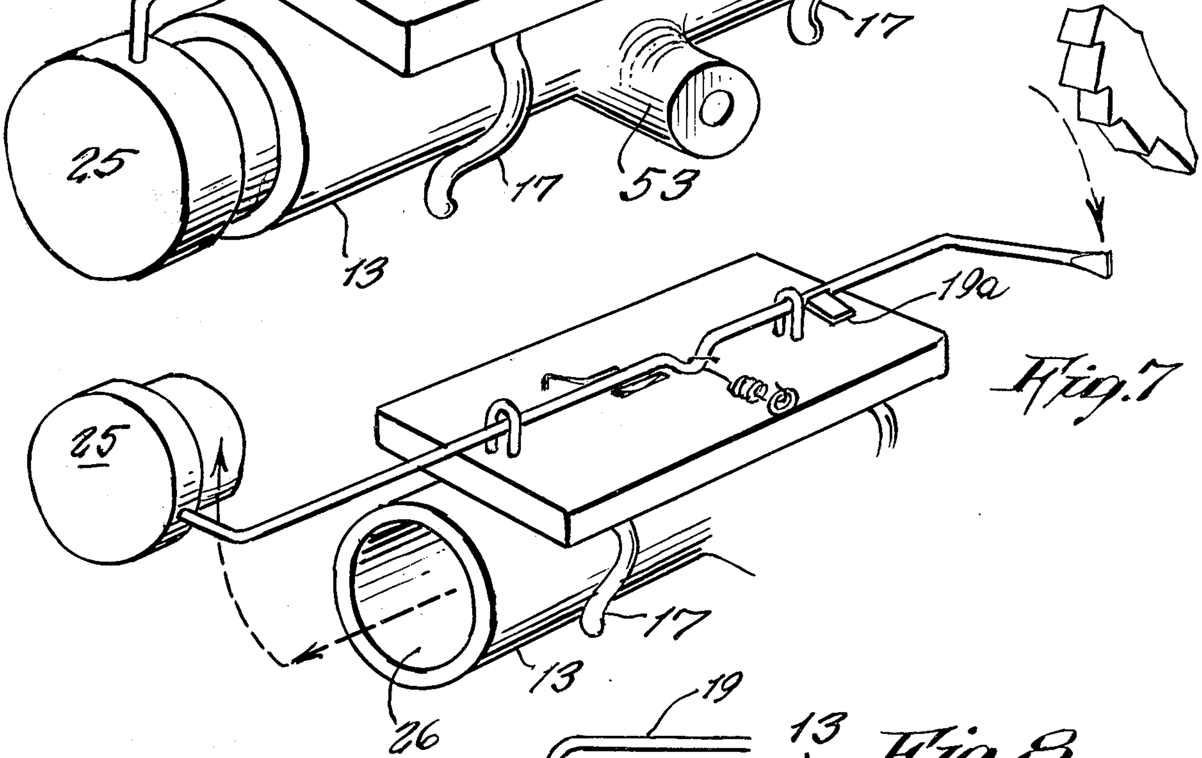
Fig. 7
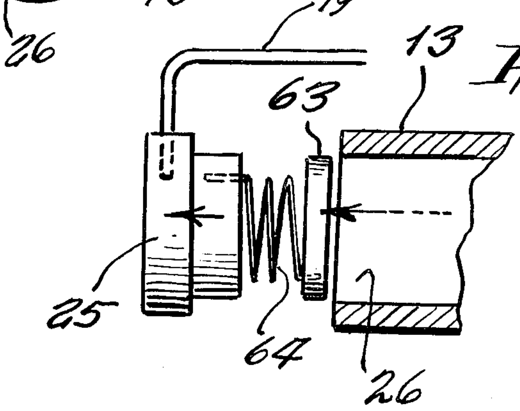
Fig. 8
Fig. 9
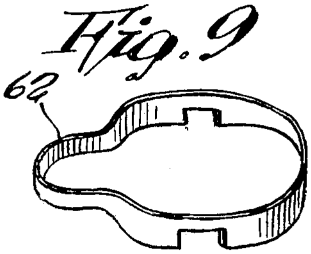

SYSTEM GAS ALARM

This invention relates generally to safety alarms.

It is well known that conventional domestic gas cylinders are provided with safety valves for allowing gas to escape if gas pressure gets excessive, so to prevent the cylinder from exploding if the cylinder is in a house, the escaping gas is a fire hazard and can poison the air to the residents. This situation is accordingly in want of an improvement.

Therefore it is a principal object of the present invention to provide an audible alarm for being heard by residents in case the gas is being discharged from the cylinder.

Another object is to provide a gas alarm which can be readily and easily attached to a conventional gas cylinder.

Another object is to provide a gas alarm which is simple in construction and designed so to be positive to work.

In the drawing:

FIG. 5 is a detail view of the toothed wheels and wind up spring.

FIG. 6 is a perspective view of the tripping mechanism shown in set position.

FIG. 7 shows it after being sprung.

FIG. 8 is a detail view of another design of plug or trigger shield, illustrated in FIG. 1.

FIG. 9 is a detailed view of a modified valve collar.

Figures 1, 2, 3, 4:
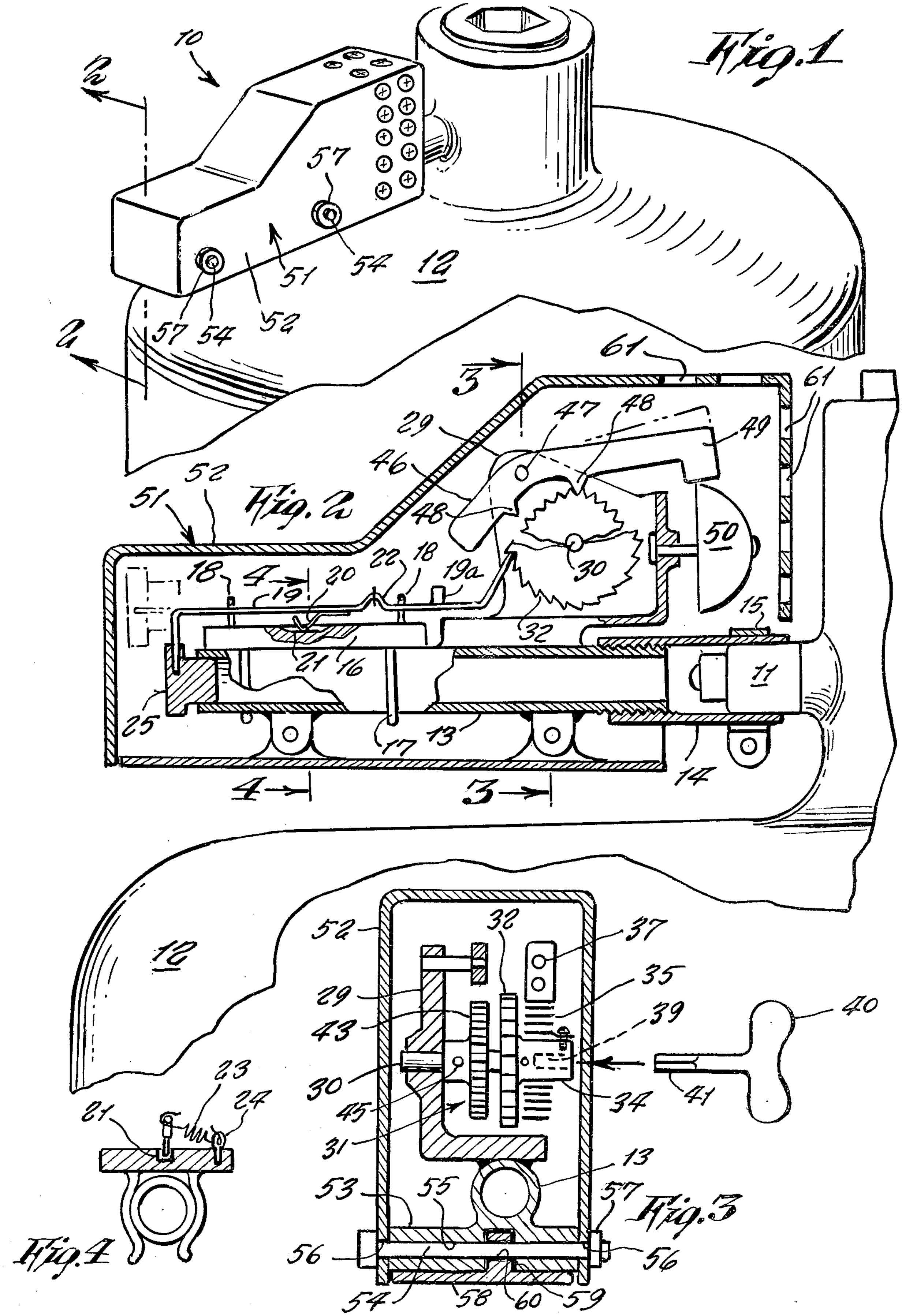
FIG. 1 is a perspective view of the invention mounted on a domestic gas cylinder.
FIG. 2 is a cross sectional view on line 2—2 of FIG. 1.
FIG. 3 is a cross sectional view on line 3—3 of FIG. 2.
FIG. 4 is a cross sectional view on line 4—4 of FIG. 2.

Referring now to the drawings in greater detail, and more specifically to FIGS. 1 through 7 at this time, the reference numeral 10 represents a gas alarm according to the present invention, and which is mounted upon a safety valve 11 of a gas cylinder 12.

The gas alarm includes a support tube 13 thread-engaged on a connecting socket 14 fitted on the safety valve and rigidly secured thereto by a conventional hose clamp 15.

A flat platform 16 is provided with a pair of clamps 17 on its underside for clamping around the tube. A pair of U-shaped staples 18 mounted on top of the platform serve as bearings in which an elongated, stiff wire, trigger arm 19 is rotatably supported. A hook-shaped spur 20 welded along a side of the trigger arm is slidable in a groove 21 upon the upper side of the platform, so as to prevent rotation of the trigger arm while the spur is engaged therein.

A U-shaped bend 22 along the trigger arm is grasped by one end of a tension coil spring 23 which at its other end is anchored to an eyelet 24 mounted upon the platform, the spring normally urging the trigger arm to rotate.

One end of the trigger arm is bent at right angle and is affixed to a plug 25 which is slidably fitted into an end opening 26 of the tube. The plug may be made solid or hollow for gas to enter and thrust it outward.

The other end of the trigger arm is bent at an inclined angle, as shown at 27, and a terminal end 28 thereof is flattened blade shaped. A rib 19*a* along the trigger arm abutts the staple 18 and a top of the platform as shown in FIG. 7, preventing the arm from further outward sliding in use.

The tube 13 is made integral with a stationary, upright fin or wall 29 supporting a pivot shaft 30 on which a drive unit 31 is affixed. The drive unit includes a ratchet toothed wheel 32 having teeth 33 against which the blade shaped end 28 of the trigger arm abuts. A hub 34 of the wheel 32 has a spring 35 therearound, one end of the spring being attached by screw 36 to the hub, and the spring other end being anchored by screws 37 to a stationary wall 38 integral with and at right angle to the wall 29. A square hole 39 in one end of the hub receives a removable key 40 having a square shank 41, so as to wind up the spring and thus serve as a motor for rotation of the ratchet wheel affixed by dowel 42 on the shaft.

A tooth wheel 43 having pointed teeth 44 is also affixed by a dowel 45 on the shaft. A lever 46, freely pivotable about a pivot pin 47 mounted in wall 29, has two pointed teeth 48 positioned on opposite sides from the pivot pin so to alternately engage the teeth 44 and thus produce an escapement mechanism for the unit 31, as the lever thus rocks back and forth due to the alternate teeth engagement.

A hammerhead 49 on an end of the rocking lever thus strikes a bell 50 supported upon the wall 38.

All of the above described mechanism is enclosed within a case 51 so as to not be tampered with by children or other persons. The case includes an inverted, U-shaped cover 52 which also bridges a pair of transverse pads 53 formed integral with tube 13. A bolt 54 through a hole 55 in each pad extends also through holes 56 of the cover, and is fitted with nut 57. A bottom wall 58 provided with lugs 59 having holes 60 is also supported from the bolts 54. Thus, the mechanism is protectively enclosed.

One end of the cover 51 is provided with spaced perforations 61 on all four sides, and which are of grille type, so as to allow the sound from the bell to pass outwardly of the case in order to be heard.

At present, almost all domestic gas cylinders have a built-in collar welded on top of the dome and circling the nozzle. As the protective cage will reach out to the external circumference of the cylinder, a part of the collar will have to be cut away before the mechanism is mounted. In future, the collar can be made to contour the alarm mechanism and completely circle it as shown at 62, in FIG. 9.

To set up the device, after installation on the safety valve, the trigger arm is rotated in a position so that the plug 25 is pushed into tube opening 26, and the spur 20 fits into groove 21, while the trigger arm bladed end 28 is abutted between the ratchet teeth 33. This set up position is shown in FIG. 6. It is to be noted that spring 23 is stretched. The spring 35 is then wound up by the key 40 so as to form a spring motor. The case 51 is then mounted around the device so to enclose the same.

In case of a gas pressure increase inside the cylinder, the safety valve automatically opens, and gas escapes into the tube, where the increasing gas pressure forces the plug to be pushed out and the spur to travel out an end of the groove 21 thus allowing spring 23 to rotate the trigger arm so that blade end 28 disengages with the ratchet wheel 32 thus allowing the spring motor to rotate the toothed wheel 43 so to cause the lever to rock and the hammerhead repeatingly strike the bell until the spring motor fully unwinds. Thereafter for reuse, the device must again be reset, as stated.

In FIG. 8, a modified design of the plug includes a piston 63 attached to the plug by a compression coil spring 64 therebetween; the piston fitting completely inside the tube opening 26. In operative use the increasing gas pressure inside the tube pushes against the piston, instead against the plug. The piston pushes the plug, the spring 64 being compressed. When the plug is finally pushed out the tube opening, the compressed spring then pulls the piston out the tube opening quickly and with force so that the spur is sure to be forced out the end of the groove.

What is claimed or new, is:

1. A gas alarm, comprising in combination, a tube affixed by a socket on the outlet of a safely valve of a gas cylinder, a plug sealingly mounted in the outlet end of said tube, including a trigger arm connected to the outer end of said plug, a rotatable spring motor drive unit retained by said trigger arm when said plug is in said tube in combination with means for releasing said unit from said arm responsive to movement of said plug from said tube wherein said means comprise a platform clamped to said tube including bearings in which said trigger arm is rotatably supported a spur on said trigger arm slidably fitting in a retaining groove in said platform, and a tension spring urging said trigger arm to rotate, said groove retaining said arm against rotation wherein said drive unit includes a ratchet wheel retained by said trigger arm in further combination with a lever having escapement teeth engaging said toothed wheel, and a hammerhead on said lever adapted to strike a bell when said when said wheel rotates, said trigger arm having an end portion eccentric to the trigger arm axis in contact with said wheel, whereby trigger arm rotation releases said wheel for rotation.

2. A gas alarm as in claim 1, including a piston connected to said plug with a compression spring in combination with a cage surrounding the alarm.

* * * * *